United States Patent
Jones et al.

(10) Patent No.: US 10,614,538 B2
(45) Date of Patent: Apr. 7, 2020

(54) OBJECT DETECTION USING AUTONOMOUS ROBOT DEVICES

(71) Applicant: Walmart Apollo, LLC, Bentonville, AR (US)

(72) Inventors: Nicholaus Adam Jones, Fayetteville, AR (US); Matthew Allen Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 273 days.

(21) Appl. No.: 15/651,693

(22) Filed: Jul. 17, 2017

(65) Prior Publication Data

US 2018/0053275 A1  Feb. 22, 2018

Related U.S. Application Data

(60) Provisional application No. 62/375,525, filed on Aug. 16, 2016.

(51) Int. Cl.
*B25J 19/00* (2006.01)
*G06Q 50/28* (2012.01)
(Continued)

(52) U.S. Cl.
CPC ............ *G06Q 50/28* (2013.01); *B25J 19/021* (2013.01); *G01C 21/206* (2013.01); *G05B 19/124* (2013.01); *G05D 1/0088* (2013.01); *G05D 1/027* (2013.01); *G05D 1/0231* (2013.01); *G05B 2219/23363* (2013.01); *G05D 2201/0216* (2013.01)

(58) Field of Classification Search
USPC ................................................. 700/245–264
See application file for complete search history.

(56) References Cited

U.S. PATENT DOCUMENTS 7,347,361 B2  3/2008  Lovett
7,543,741 B2  6/2009  Lovett
(Continued)

OTHER PUBLICATIONS

Mathecsys, Visual Shelf Monitoring, http://mathecsys.com/visualshelfmonitoring/, last viewed Apr. 13, 2016.
(Continued)

*Primary Examiner* — Jonathan L Sample
(74) *Attorney, Agent, or Firm* — McCarter & English, LLP (57) ABSTRACT

Described in detail herein are methods and systems for detecting absent physical objects using autonomous robot devices. In exemplary embodiments, the system includes shelving units disposed throughout a facility storing sets of physical objects. A first set of machine readable representations can be disposed on the front surface of the shelving unit and a second set of machine readable representations can be disposed on the back wall of the shelving unit. The first and second set of machine readable representations can be encoded with identifiers associated with the sets of physical objects. An autonomous robot device can be configured to detect and read a first set of machine-readable representations in response to successfully detecting and reading the second set of machine readable representations the autonomous robot device can determine the absence of a set of like physical objects.

20 Claims, 5 Drawing Sheets

(51) Int. Cl.
*G01C 21/20* (2006.01)
*G05D 1/00* (2006.01)
*B25J 19/02* (2006.01)
*G05D 1/02* (2020.01)
*G05B 19/12* (2006.01)

(56) References Cited

U.S. PATENT DOCUMENTS

| | | | |
|---|---|---|---|
| 7,810,720 | B2 | 10/2010 | Lovett |
| 8,321,303 | B1 | 11/2012 | Krishnamurthy et al. |
| 8,941,645 | B2 | 1/2015 | Grimaud |
| 9,262,741 | B1* | 2/2016 | Williams ............. G06Q 10/087 |
| 9,827,683 | B1* | 11/2017 | Hance .................... B25J 19/023 |
| 9,908,239 | B1* | 3/2018 | O'Brien ..................... B25J 9/02 |
| 9,911,138 | B2* | 3/2018 | Grabovski ......... G06Q 30/0268 |
| 10,130,232 | B2* | 11/2018 | Atchley ................. A47F 10/04 |
| 10,133,276 | B1* | 11/2018 | Shydo, Jr. ............ G05D 1/0214 |
| 2002/0091593 | A1* | 7/2002 | Fowler ................ G06Q 10/087 705/28 |
| 2006/0210115 | A1* | 9/2006 | Nemet ................ G05D 1/0234 382/104 |
| 2008/0077511 | A1* | 3/2008 | Zimmerman ......... G06Q 10/00 705/28 |
| 2009/0043504 | A1* | 2/2009 | Bandyopadhyay .... G01C 17/38 701/469 |
| 2009/0063307 | A1 | 3/2009 | Groenovelt et al. |
| 2009/0326709 | A1* | 12/2009 | Hooper ................... G06F 16/93 700/245 |
| 2010/0065632 | A1* | 3/2010 | Babcock ................ G06Q 10/08 235/385 |
| 2010/0121480 | A1* | 5/2010 | Stelzer ................. B65G 1/1373 700/215 |
| 2013/0173435 | A1* | 7/2013 | Cozad, Jr. ............ G06Q 10/087 705/28 |
| 2013/0231779 | A1* | 9/2013 | Purkayastha .......... B25J 9/1697 700/259 |
| 2013/0317642 | A1* | 11/2013 | Asaria .................... G06Q 10/08 700/216 |
| 2015/0088703 | A1 | 3/2015 | Yan |
| 2015/0220878 | A1 | 8/2015 | Argue et al. |
| 2016/0229631 | A1* | 8/2016 | Kimura ................ G05D 1/0291 |
| 2016/0259028 | A1* | 9/2016 | High ..................... B07C 5/3422 |
| 2016/0260054 | A1* | 9/2016 | High ..................... G05D 1/028 |
| 2017/0147966 | A1* | 5/2017 | Aversa ................ G06Q 10/087 |
| 2017/0270579 | A1* | 9/2017 | Ridao Carlini ...... G05D 1/0022 |

OTHER PUBLICATIONS

Vispera.co, Vispera Image Recognition Services for Retail, YouTube, pulbished on Jan. 27, 2015.
Barel, Joel, Trax Retail, https://www.youtube.com/watch?v=vHvq80bgHRU, Published Aug. 28, 2014.

* cited by examiner

OBJECT DETECTION USING AUTONOMOUS ROBOT DEVICES

CROSS-REFERENCE TO RELATED PATENT APPLICATIONS

This application claims priority to U.S. Provisional Application No. 62/375,525 filed on Aug. 16, 2016, the content of which is hereby incorporated by reference in its entirety.

BACKGROUND

Keeping track of physical objects in large facilities can be difficult and updating of the quantity of physical objects present in the facility can be a slow process.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein are methods and systems for detecting the presence/absence of physical objects in a facility using autonomous robot devices. In exemplary embodiments, the system can include shelving units disposed throughout facility, holding, storing and/or supporting sets of physical objects and sets of machine-readable representations. Embodiments of the system can include autonomous robot devices that are configured to autonomously navigate through the facility to detect and read a (first) set of machine-readable representations encoded with identifiers associated with the sets of physical objects. The first set of machine-readable representations can be disposed on the front face/surface of shelves of the shelving units. The autonomous robot device can attempt to detect and read a (second) set of machine readable representations encoded with identifiers associated with the sets of physical objects. This set of machine-readable representations can be disposed on a back wall of the shelving units and can be obstructed by one or more physical objects when one or more physical objects are present on the shelving unit. In response to successfully detecting and reading the at least one of the machine-readable representations in the second set, the autonomous robot device can determine that a set of like physical objects associated with the read machine-readable representation are absent from an expected location in the shelving units. The autonomous robot device can transmit the read identifier to the computing system.

In exemplary embodiments, the first and second sets of machine-readable elements can be vertically aligned with each other. When physical objects are disposed on a shelf, the first set of machine-readable representations can be visible and one or more of the machine-readable representation in the second set can be obscured by the physical objects.

Embodiments of the autonomous robot device can include a controller, a drive motor, and an optical scanning machine. The autonomous robot device can include an inertial navigation system including an accelerometer and/or a gyroscope and can be configured to roam autonomously through the facility in response to operation of the drive motor by the controller. As the autonomous robot device navigates through the facility, the autonomous robot device can detect via the optical scanner, at a first location along the shelf, a first machine-readable representation from the first set of machine-readable representations and a corresponding first machine-readable representation from the second set of machine-readable representations and determine, in response to detection of the first machine-readable representation and the corresponding first machine-readable representation that additional physical objects associated with the first machine-readable representation are required at the first location. The autonomous robot device can roam through the facility using the inertial navigation system. In some embodiments, the autonomous robot device can roam through the facility based on a predetermined path.

The autonomous robot device can be configured to detect via the optical scanner, at a second location along the shelf, a second machine-readable representation from the first set of machine-readable representations. The autonomous robot device, determines that at least one physical object is obstructing a corresponding second machine-readable representation in the second set of machine-readable representations and determines that the at least one physical object corresponds to the first machine-readable representation of the first set machine readable representations.

Embodiments of the autonomous robot device can include an image capturing device that is configured to capture an image of the second location. Based on the image, the autonomous robot device can identify the at least one physical object obscuring the corresponding second machine-readable representation. In response to the autonomous robot device identifying the at least one physical object, the autonomous robot can determine whether the at least one physical object corresponds to the second-machine readable representation in the first set.

In some embodiments, the autonomous robot device can be configured to scan the first machine-readable representation in the first set and the corresponding first machine-readable representation in the second set in a single scan.

Embodiments of the system can include a computing system communicatively coupled with the autonomous robot device. The computing system can be configured to trigger an event in response to the autonomous robot determining that additional physical objects are required at the first location. Examples of events that can be triggered can include, but are not limited to issuing an alert or transmitting a message for replenishment of the physical objects at the first location.

Figure 1A:
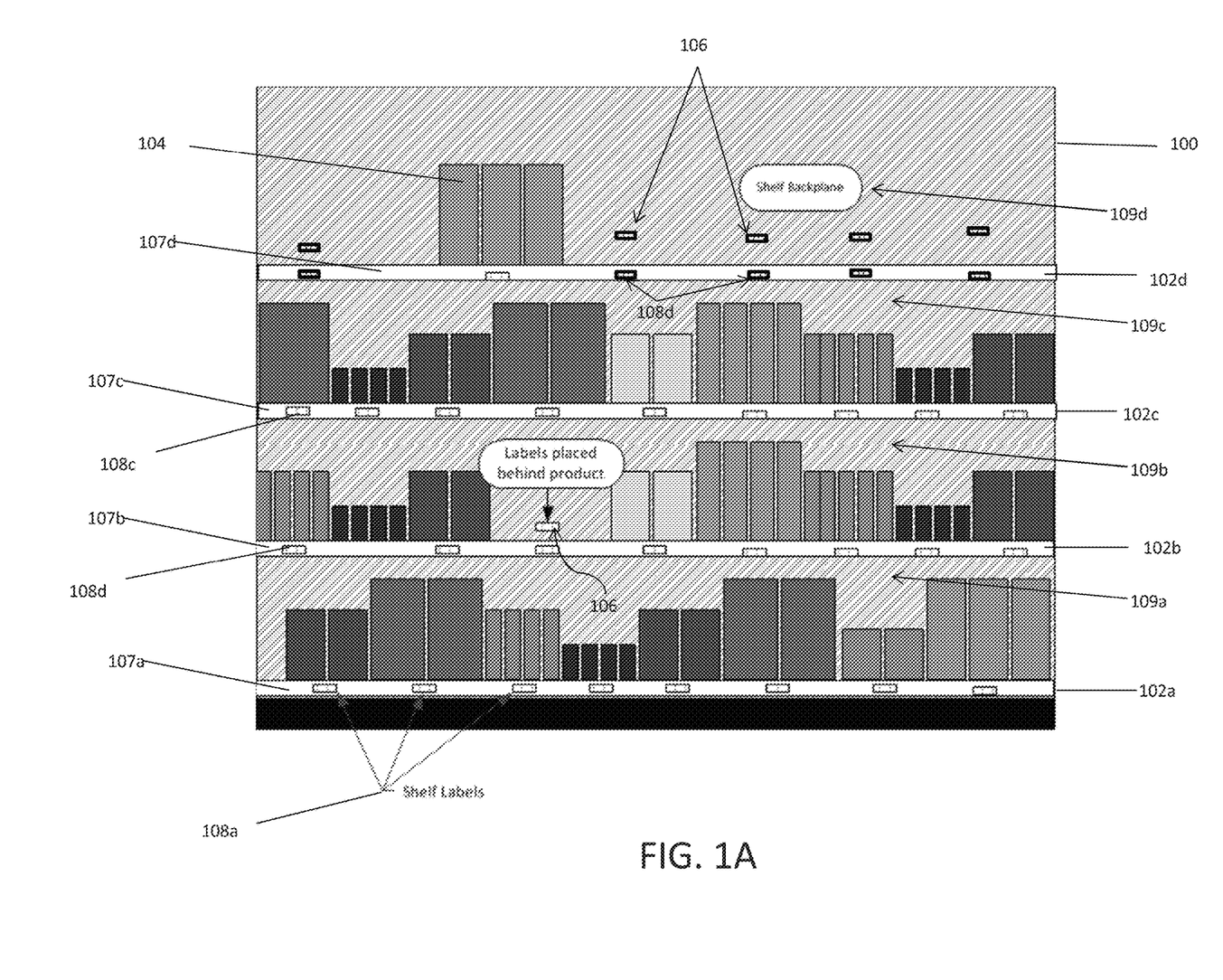
FIG. 1A is a block diagram of an exemplary shelving unit according to embodiments of the present disclosure.

FIG. 1A is a block diagram of an exemplary shelving unit 100 according to embodiments of the present disclosure. The shelving unit 100 can be disposed in a facility and can be figured with shelves 102a-d configured to hold, store and support various sets of physical objects 104. The physical objects 104 can be disposed on the shelves 102a-d based on a predetermined planogram or other mapping.

A first set of machine-readable representations 108a-d can be disposed along the front face/surface of the shelves 102*a-d*. For example, the first set of machine-readable representations can be printed on labels affixed to the front face/surface of the shelves 102*a-d*. The first set of machine readable representations 108*a-d* can be encoded with an identifier associated with the set of physical objects 104 disposed on the shelves 102*a-d* and each set of physical objects 104 can have a different identifier. The machine-readable representations in the first set 108*a-d* can include barcodes and/or QR codes. Each of the machine-readable representation in the first set can be disposed at a location on the shelving unit 100 that corresponds to a location at which a corresponding set of physical objects are expected to be disposed. For example, a machine-readable representation 108*d* in the first set can be disposed at a location 107*d* along the shelf 102*d* and a set of physical objects 104 corresponding to the machine-readable representation 108*d* can be disposed at the location 107*d* along the shelf.

A second set of machine-readable representations 106 can be disposed along a front surface of a back wall 109 of the shelving unit 100 above each of the shelves 102*a-d*. As shown in FIG. 1A, the machine-readable representations in the second set 106 can be obscured by the sets of physical objects 104 disposed on the shelves 102*a-d*. The second set of machine readable representations 106 can be disposed so that the machine-readable representation in the second set 106 are vertically aligned with corresponding machine-readable representations in the first set 108. For example, there can be a one-to-one correspondence between the machine-readable representations in the first set 108 and the machine-readable representations in the second set 106 such that pairs of machine-readable representations between the first and second sets of machine readable representations can be formed. The machine-readable representations in the second set 106 can correspond to sets of physical objects 104 disposed on the shelves 102*a-d* such that each of the machine-readable representation in the second set can be disposed at a location on the shelving unit 100 that corresponds to a location at which a corresponding set of physical objects are expected to be disposed. For example, a machine-readable representation 108*d* in the first set can be disposed at a location 107*d* along the shelf 102*d* and a set of physical objects 104 corresponding to the machine-readable representation 108*d* can be disposed at the location 107*d* along the shelf. The corresponding machine-readable representation in the second set 106 can be disposed behind the set of physical objects 104 such that the corresponding machine-readable representation in the second set is obscured by the set of physical objects 104. The second set of machine readable representations 106 can be encoded with an identifier associated with corresponding sets of physical objects 104 and each set of physical objects 104 can be associated with a different identifier. The machine-readable representations in the second set 106 can include barcodes and/or QR codes. In some embodiments, the second set of machine readable representations 106 can include multiple machine readable representations for each set of like physical objects 104.

When physical objects are disposed on the shelves 102*a-d* at each location at which a machine-readable represent from the first set is disposed, the first set of machine-readable representations can be visible, while the second set of machine-readable representations can be obscured by the physical objects. When a set of physical objects is absent from a location a shelf, the machine-readable representation in the second set can be unobscured/visible.

In some embodiments, machine-readable representations in the second set 106 can be partially obscured by a set of the physical objects. For example, the second set of machine-readable representations can include three machine-readable representations associated with and disposed behind a set of physical objects. When the set of physical objects is present on the shelving unit 102, the three machine readable representations are not visible and when the set of physical objects is completely absent all three machine readable representations are visible. In some embodiments, when a subset of the set of physical objects are present on the shelving unit 102, one or two of the machine readable representations can be visible. The additional barcodes can be dependent on the amount of facings on the shelf.

Figure 1B:
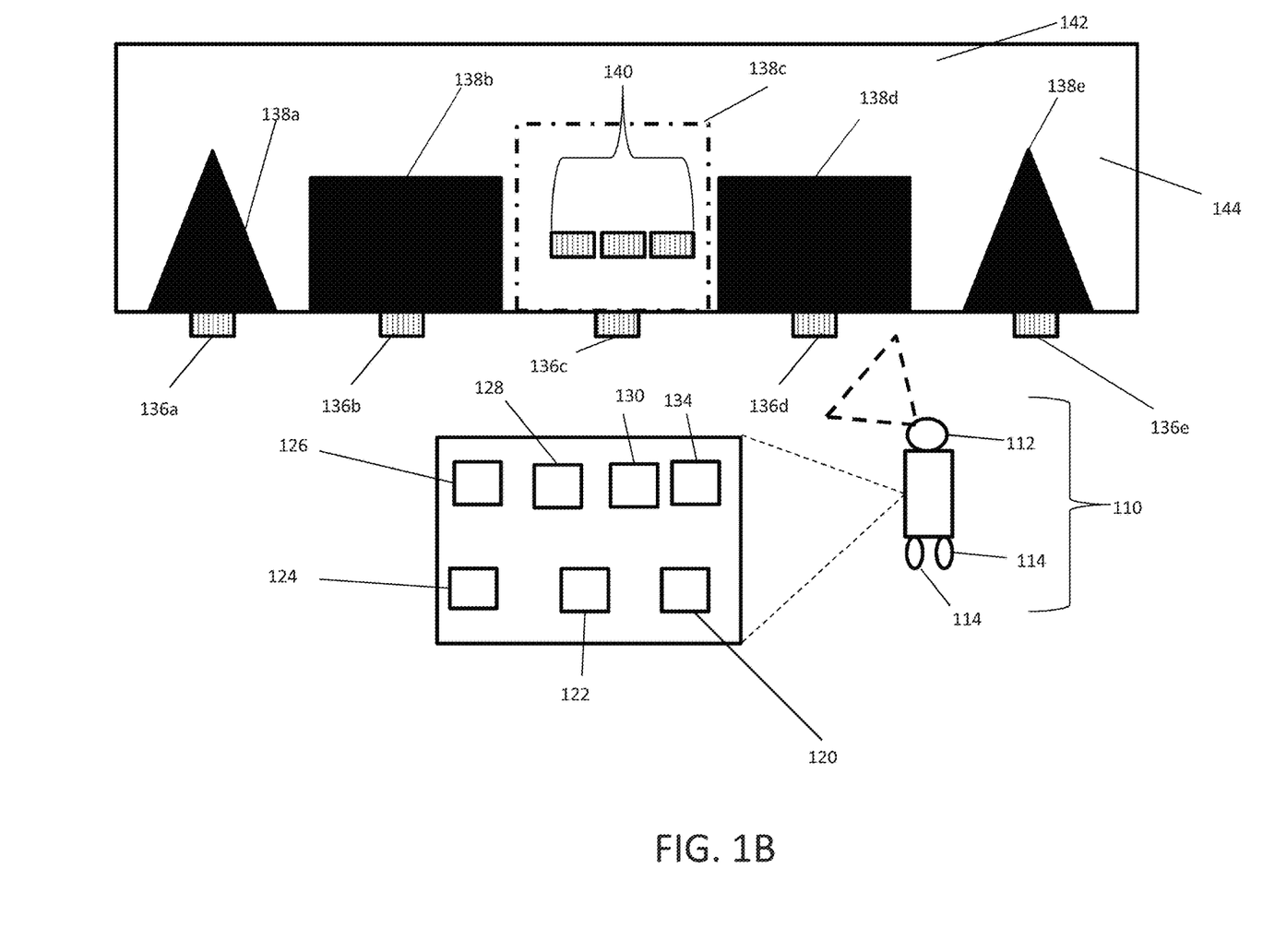
FIG. 1B is a block diagram of an embodiment autonomous robot devices in accordance with embodiments of the present disclosure

FIG. 1B is a block diagram of an embodiment autonomous robot devices in accordance with embodiments of the present disclosure. The autonomous robot devices 110 are configured to detect a presence/absence of physical objects from shelving units in a facility (e.g., a shelving unit 144). The autonomous robot device 110 can be a driverless vehicle, an unmanned aerial craft, and/or the like. The autonomous robot device 110 can include an image capturing device 112, motive assemblies 114, a controller 124, an optical scanner 126, a drive motor 128, a GPS receiver 130, accelerometer 132 and a gyroscope 134, and can be configured to roam autonomously through the facility. The autonomous robot device 110 can be and intelligent device capable of performing tasks without human control.

The controller 124 can be programmed to control an operation of the image capturing device 112, the optical scanner 126, the drive motor 128, the motive assemblies 114 (e.g., via the drive motor 128), in response to various inputs including inputs from the GPS receiver 130, the accelerometer 132, and the gyroscope 134. The drive motor 128 can control the operation of the motive assemblies 114 directly and/or through one or more drive trains (e.g., gear assemblies and/or belts). The motive assemblies 114 can be but are not limited to wheels, tracks, rotors, rotors with blades, and propellers. The motive assemblies 114 can facilitate 360 degree movement for the autonomous robot device 110. The image capturing device 112 can be a still image camera or a moving image camera. The optical scanner 126 can scan machine readable representations.

The controller 124 of the autonomous robot device 110 can be configured to control the drive motor 128 to drive the motive assemblies 114 so that the autonomous robot device 110 can autonomously navigate through the facility based on a map of the facility and/or can generate a map of the first facility using simultaneous localization and mapping (SLAM) Likewise, the autonomous robot device 110 can be programmed with a map of the second facility and/or can generate a map of the second facility using simultaneous localization and mapping (SLAM). For example, the accelerometer 132 and gyroscope 134 can determine the direction, orientation, position, acceleration, velocity, tilt, pitch, yaw, and roll of the autonomous robot device 110, and the controller can implement one or more algorithms, such as a Kalman filter, for determining a position of the autonomous robot device 110.

In some embodiments, the controller 124 of the autonomous robot device 110 can be configured to control the drive motor 128 to drive the motive assemblies 114 so that the autonomous robot device 110 can autonomously navigate through the facility based on inputs from the GPS receiver 130, accelerometer 132 and gyroscope 134. The GPS receiver 130 can be a L-band radio processor capable of solving the navigation equations in order to determine a position of the autonomous robot device 110, determine a velocity and precise time (PVT) by processing the signal broadcasted by GPS satellites.

In exemplary embodiments, the autonomous robot device 110 can roam the facility and detect a first set of machine-readable representations 136a-e on the shelving units using the image capturing device 112. The first set of machine-readable representations 136a-e can be disposed along a front face/surface of a shelf of the shelving unit 144. A second set of machine-readable representations can be disposed on a front surface of a back wall of the shelving unit 144 above the shelf upon which the first set of machine-readable representations are disposed. The second set of machine-readable representations can be encoded with the same identifier as the corresponding first set of machine-readable representations. In response to detecting the first set of machine readable representations 136a-e, the autonomous robot device 112 can scan and read the first set of machine readable representations 136a-e using the optical scanner 126. For example, the autonomous robot device 110 can scan and read machine readable representation 136b associated with a set of physical objects 138b. The autonomous robot device 110 can attempt to read machine-readable representations of the second set that are associated with the set of physical objects 138b. However, since the set of physical objects 138b are present on the shelving unit 144, the machine-readable representations in the second set that are associated with the set of physical objects 138b may not be visible to the autonomous robot device 110 and the autonomous robot device may not be able to scan and read the machine readable representations in the second set that are associated with the set of physical objects 138b.

In another example, the autonomous robot device 110 can scan and read machine readable representation 136c associated with set of physical objects 138c. The autonomous robot device 110 can attempt to scan and read machine readable representations 140 in the second set that are associated with the set of physical objects 138c. As shown in FIG. 1B, the machine-readable representation 136c can be disposed on a front face of the shelf and machine-readable representations 140 can be disposed on a front surface of a back wall of the shelving unit above the shelf. The machine readable representations 140 in the second set can include multiple labels with the machine readable representations (e.g. three labels) encoded with the same identifier associated with the set physical objects 138c. The autonomous robot device 110 can scan and read the machine readable representations 140 and based on scanning the machine readable representations 140, the autonomous robot device 110 can determine the set of physical objects 138c is absent from the shelving unit 144. The autonomous robot device 110 can decode and transmit the identifier of the absent physical objects 138c to a computing system. In other embodiments, the autonomous robot device 110 can transmit the machine-readable representation 138c to the computing system without decoding the identifier.

In some embodiments, some, but not all of the machine-readable representations 140 in the second set can be visible to the autonomous robot device 110 (e.g., not obscured by physical objects). The autonomous robot device 110 can determine the set of physical objects associated with the second set of machine readable representations is present on the shelving unit, but may need to be refilled, based on reading some, but not all of the machine readable representations in the second set that are associated with the set of physical objects.

Embodiments of the autonomous robot device 110 can determine using the image capturing device 112 that one or more physical objects unrelated to the first and/or second set of machine readable representations is disposed in an incorrect location. For example, one or more physical object can be placed on the shelf above a machine-readable representation in the first set such that the one or more physical objects block a machine-readable representation in the second set. While the autonomous robot device 110 may be unable to read the machine-readable representation in the second set, it can determine that the physical object(s) obstructing the machine-readable representation in the second set does not correspond to a specific physical object expected to be disposed above the machine-readable representation in the first set based on an analysis on images of the physical object(s) captured by the robot in response to reading the machine-readable representation in the first set. For example, the autonomous robot device 110 can interact with a computing system to retrieve stored images of physical objects corresponding to the read machine-readable representation and the images captured by the autonomous robot device 110 can be compared against the retrieved stored images. In response to determining that the physical object(s) on the shelf do not correspond to the read machine-readable representation in the first set, the autonomous robot 110 can generate an exception message indicating that the physical object(s) should be removed from the scanned locations and that additional physical object(s) associated with the read machine-readable object may be need to fill the shelf.

In some embodiments, the autonomous robot device 110 can capture a machine readable representation in the first set and a corresponding one or more of the machine-readable representations in the second set in a single scan. The autonomous robot device 110 can confirm the first and second machine readable representations are encoded with the same identifier. The autonomous robot device 110 can determine the set of like physical objects associated with the identifier are absent from the shelving unit in response to scanning the machine-readable representation in the first set and the corresponding one or more machine-representation in the second set in the single scan.

Figure 2:
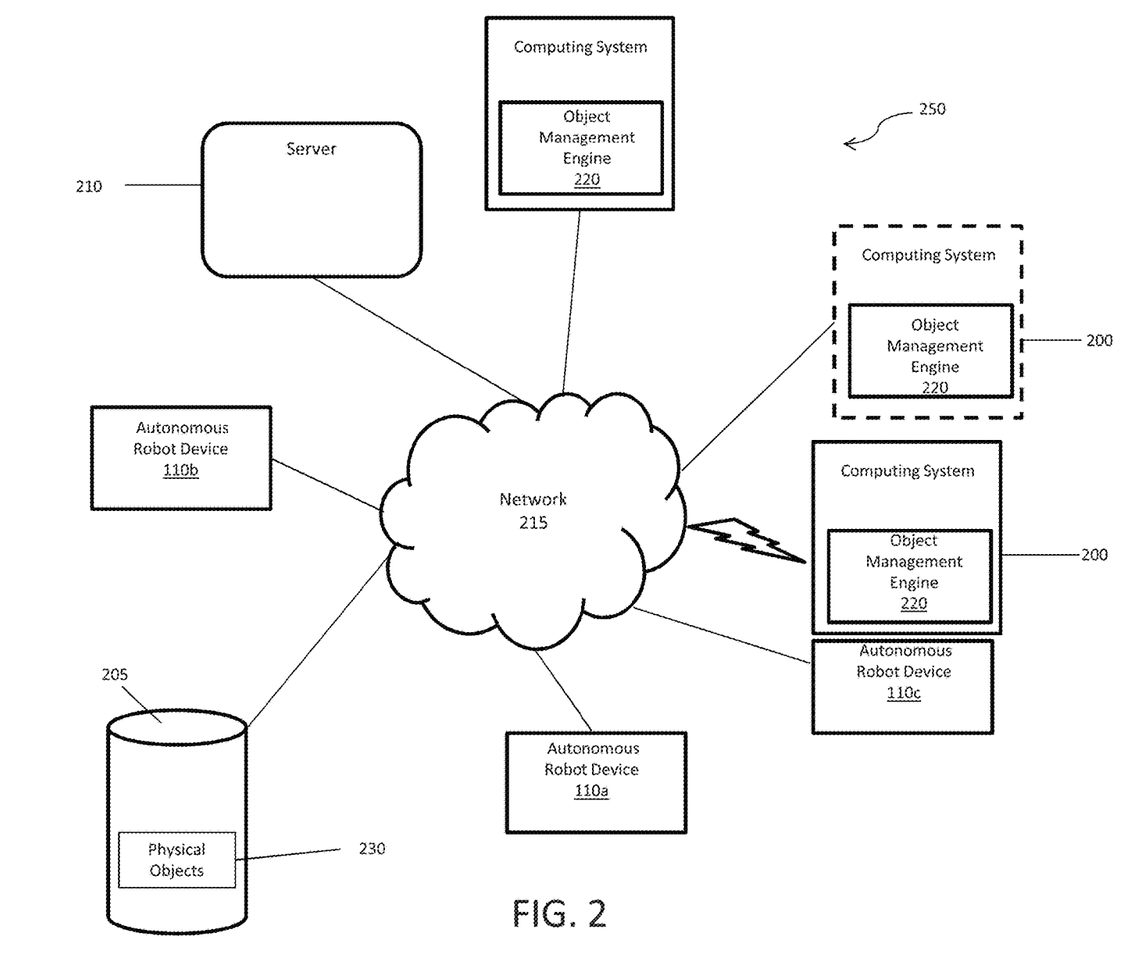
FIG. 2 illustrates an autonomous object detection system according to exemplary embodiments.

FIG. 2 illustrates an autonomous object detection system 250 according to exemplary embodiments. The autonomous object detection system 250 can include one or more databases 205, one or more servers 210, one or more computing systems 200 and the autonomous robot devices 110a-c. In exemplary embodiments, the computing system 200 is in communication with the databases 205, the one or more servers 210, and the autonomous robot devices 110a-c, via a communications network 215. The computing system 200 can implement an object management engine 220 that is in communication with the autonomous robotic devices 110a-c to perform one or more operations in response to transmission received from the autonomous robot devices 110a-c. For example, in some embodiments, the computing system 200 can transmit an alert based on the absence of the set of like physical objects from the shelving unit.

In an example embodiment, one or more portions of the communications network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 210 and the databases 205 are connected to the communications network 215 via a wired connection. Alternatively, the server 210 and the databases 205 can be connected to the network 215 via a wireless connection. The server 210 includes one or more computers or processors configured to communicate with the computing system 200 and the databases 205, via the network 215. The server 210 hosts one or more applications configured to interact with one or more components of the computing system 200 and/or facilitates access to the content of the databases 205. The databases 205 may store information/data, as described herein. For example, the databases 205 can include a physical object database 230. The databases 205 and server 210 can be located at one or more geographically distributed locations from each other or from the computing system 200. Alternatively, the databases 205 can be included within server 210.

In exemplary embodiments, the computing system 200 can receive an identifier of an absent set of like physical objects in a shelving unit disposed in a facility from an instance of the autonomous robot devices 110a-c. The computing system 200 can query the physical objects database 245 to determine the quantity of physical objects designated to be disposed at the facility. In response to retrieving the amount of physical objects designated to be disposed at the facility, the computing system 200 can determine whether the physical objects absent from the shelving unit in the facility are presently disposed at another location of the facility. The computing system 200 can also determine that the physical objects are absent from the facility and trigger a replenishment of the physical objects to the facility. The computing system 200 can update the physical objects database with respects to the quantity of physical objects available at the facility based on the absence of physical objects on the shelving unit.

As a non-limiting example, autonomous object detection system 250 can be implemented in a retail store to detect out of stock products from shelving units. The autonomous robot device can roam the retail store and detect the first set of machine-readable representations disposed at the front surface of the of the shelving unit. The first set of machine-readable representations can be barcodes or QR codes encoded with identifiers associated with sets of products. For example, one machine readable representation from the first set of machine-readable representations can be associated with one set of like products. The autonomous robot device can read and scan the first set of machine-readable representations using the optical scanner. Subsequently the autonomous robot device can attempt to scan and read machine-readable representations from the second set of machine readable representations disposed on the back wall of a shelving unit. Each set of like products disposed on the shelving unit can have multiple machine readable representations from the second set of machine readable representations associated with and disposed behind the set of like products. The second set of machine readable representations can be visible/detectable to the autonomous robot device when a set of like products are not present on the shelving unit, otherwise the set of like products obstruct the view of the second set of machine readable representations. In response to being able to scan and read the second set of machine-readable representations the autonomous robot device can determine the set of like products associated with the scanned and read second set of machine-readable representations are out of stock. The autonomous robot device can send the decoded identifier or the machine readable representation to the computing system.

Figure 3:
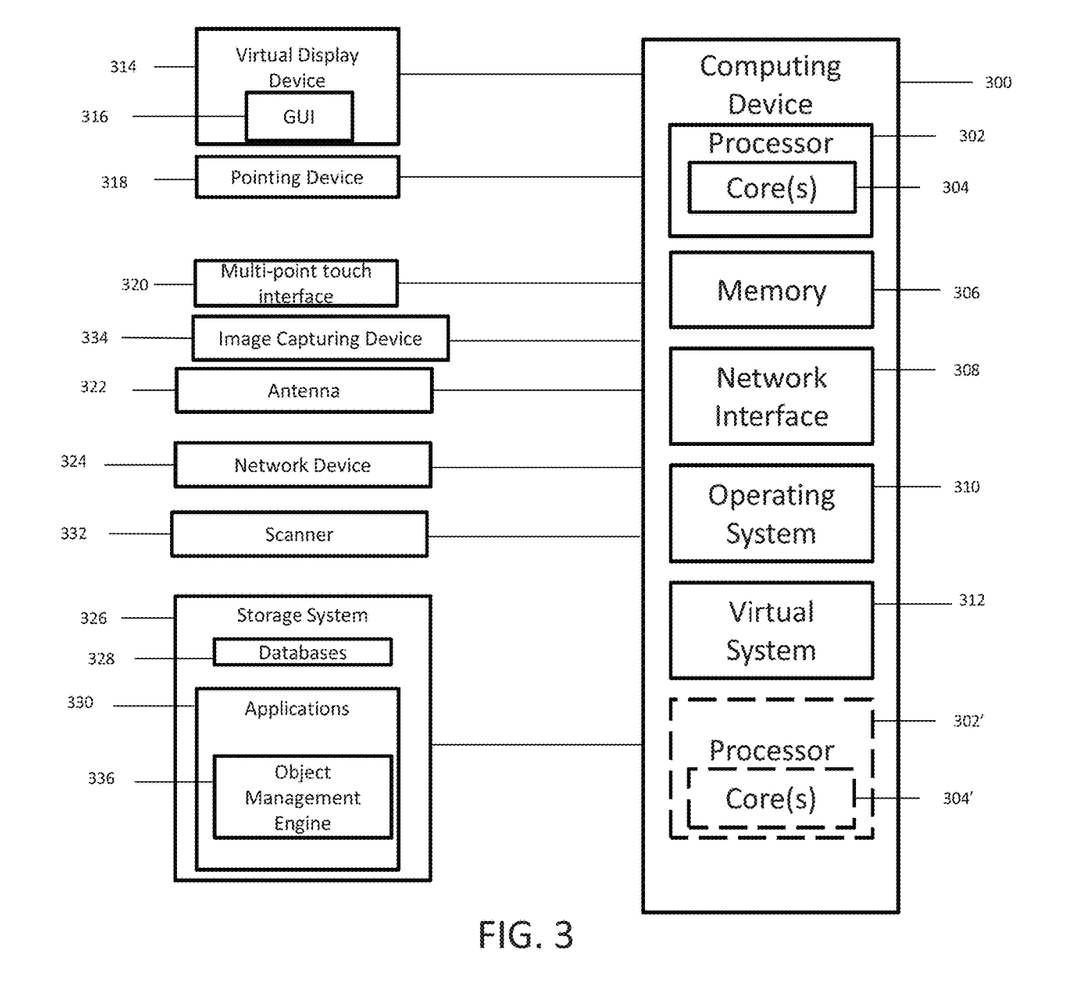
FIG. 3 illustrates an exemplary network environment of a computing system in accordance with exemplary embodiments of the present disclosure.

FIG. 3 is a block diagram of an example computing device for implementing exemplary embodiments of the present disclosure. Embodiments of the computing device 300 can implement embodiments of the object management engine 336. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330, such as the object management engine 336) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

The computing device 300 can receive data from input/output devices such as, a scanner 332 and an image capturing device 334.

A user may interact with the computing device 300 through a visual display device 314, such as a computer monitor, which may display one or more graphical user interfaces 316, multi touch interface 320 and a pointing device 318.

The computing device 300 may also include one or more storage devices 326, such as a hard-drive, CD-ROM, or other computer readable media, for storing data and computer-readable instructions and/or software that implement exemplary embodiments of the present disclosure (e.g., applications 330). Exemplary storage device 326 can include one or more databases 328 for storing information regarding the physical objects. The databases 328 may be updated manually or automatically at any suitable time to add, delete, and/or update one or more data items in the databases. The databases 328 can include information such as a physical objects database 230.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
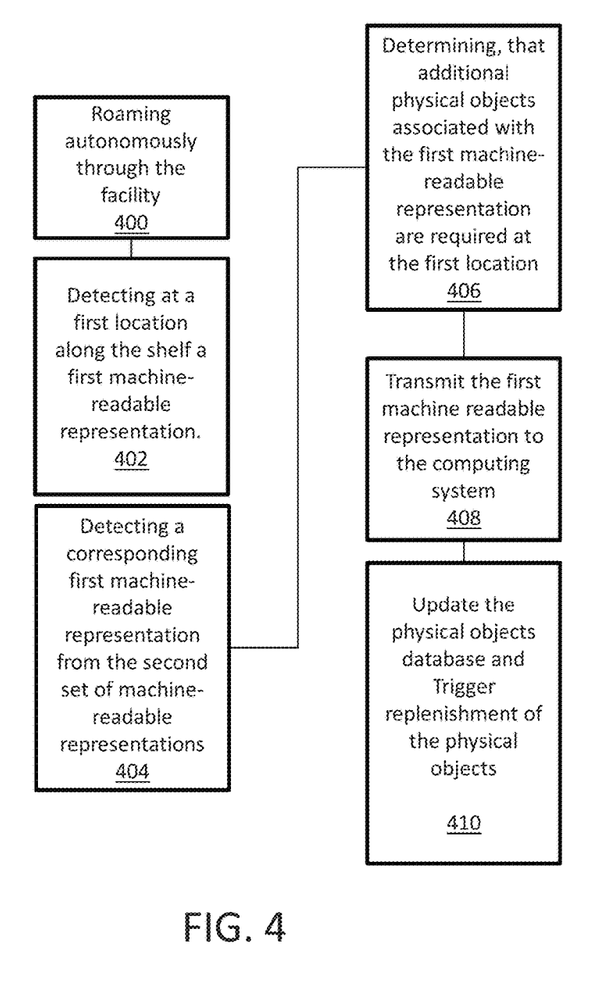
FIG. 4 is a flowchart illustrating an autonomous object detection system according to exemplary embodiments of the present disclosure.

FIG. 4 is a flowchart illustrating an exemplary process for detecting the presence/absence of physical objects according to exemplary embodiments of the present disclosure. In operation 400, an autonomous robot device (e.g. an embodiment of the autonomous robot device 110 shown in FIG. 1B) can roam autonomously throughout a facility using a controller and a drive motor (e.g. an embodiment of the drive motor 128 shown in FIG. 1B). The autonomous robot device can include an optical scanner (e.g. an embodiment of the optical scanner 126 shown in FIG. 1B). The facility can include shelving units (e.g. an embodiment of the shelving units 100 and 144 shown in FIGS. 1A and B, respectively) disposed throughout the facility. Physical objects (e.g. embodiments of the physical objects 138*a-e* shown in FIG. 1B) can be disposed on the shelving unit. The shelving unit can have labels including a first set of machine-readable representations (e.g. an embodiment of the first set of machine readable representations 108 and 136*a-e* shown in FIGS. 1A and B, respectively) disposed along a front face of a shelf of the shelving unit and a second set of machine-readable representations (e.g. an embodiment of the second set of machine readable representations 106 and 140 shown in FIGS. 1A and B) disposed along a front surface of a back wall of the shelving unit. The second set of machine-readable representations can be disposed above the front face and vertically aligned with the first set of machine-readable representations such that when physical objects are disposed on the shelf the first set of machine-readable representations are visible and the second set of machine-readable representations are obscured by the physical objects.

In operation 402, the autonomous robot device can detect a first machine-readable representation from the first set of machine-readable representation using the optical scanner. The autonomous robot device can scan the shelving units using the optical scanner after predetermined time intervals. In another embodiment, the autonomous robot device can detect the label including the first machine-readable representation using the image capturing device and can scan the first machine-readable representation in response to the detecting.

In operation 404, the autonomous robot device can detect a corresponding first machine-readable representation from the second set of machine-readable representations from the back wall of the shelving unit using the optical scanner. The autonomous robot device can detect multiple corresponding first machine-readable representations from the second set of machine-readable representations.

In operation 406, the autonomous robot device can determine the that additional physical objects are required at the first location. In operation 408, the autonomous robot device can transmit the first machine-readable representation to the computing system (e.g. an embodiment of the computing system 200 shown in FIG. 2). The computing system can decode identifier of the physical object from the first machine-readable representation. In some embodiments, the autonomous robot device can decode the identifier from the first machine-readable representation and transmit the identifier to the computing system. In operation 410, the computing system can query the physical objects database (e.g. an embodiment of the physical objects database 230 shown in FIG. 2) to retrieve the quantity of physical objects associated with the identifier designated to be disposed at the facility. The computing system can trigger a replenishment of the physical objects at the first location of the facility and update the quantity of physical objects in the first location of the facility in the physical objects database. Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

We claim:

1. An autonomous distributed computing system for use in a facility, the facility including at least one shelving unit having a first set of machine-readable representations disposed along a front face of a shelf of the shelving unit and a second set of machine-readable representations disposed along a front surface of a back wall of the shelving unit above the front face and vertically aligned with the first set of machine-readable representations such that when physical objects are disposed on the shelf the first set of machine-readable representations are visible and the second set of machine-readable representations are obscured by the physical objects, the system comprising:
  an autonomous robot device, the autonomous robot device including a controller, a drive motor, and an optical scanning machine,
  the autonomous robot device configured to (i) roam autonomously through the facility in response to operation of the drive motor by the controller, (ii) detect via the optical scanner, at a first location along the shelf, a first machine-readable representation from the first set of machine-readable representations and a corresponding first machine-readable representation from the second set of machine-readable representations, (iii) determine that the first machine-readable representation is identical to the corresponding first machine-readable representation, and (iv) determine, in response to determining the first machine-readable representation is identical to the corresponding first machine-readable representation that additional physical objects associated with the first machine-readable representation are required at the first location.

2. The system of claim 1, further comprising:
  a computing system communicatively coupled with the autonomous robot device, the computing system configured to trigger an event in response to the autonomous robot determining that additional physical objects are required at the first location.

3. The system in claim 2, wherein the event is at least one of issuing an alert or transmitting a message for replenishment of the physical objects at the first location.

4. The system in claim 1, wherein the autonomous robot device further comprising an inertial navigation system including an accelerometer and a gyroscope.

5. The system in claim 4, wherein the autonomous robot device roams the facility using the inertial navigation system.

6. The system in claim 1, wherein the autonomous robot device roams the facility based on a predetermined path.

7. The system of claim 1, wherein the autonomous robot device is configured to:
  detect via the optical scanner, at a second location along the shelf, a second machine-readable representation from the first set of machine-readable representations;
  determine that at least one physical object is obstructing a corresponding second machine-readable representation in the second set of machine-readable representations; and
  determine that the at least one physical object corresponds to the first machine-readable representation of the first set.

8. The system in claim 7, wherein the autonomous robot device further comprising an image capturing device.

9. The system in claim 8, wherein the autonomous robot device is configured to capture an image of the second location and identify the at least one physical object obscuring the corresponding second machine-readable representation.

10. The system of claim 9, wherein in response to the autonomous robot device identifying the at least one physical object, the autonomous robot determine whether the at least one physical object corresponds to the second-machine readable representation.

11. The system in claim 1, wherein the autonomous robot device is configured to scan the first machine-readable representation and the corresponding first machine-readable representation in a single scan.

12. An autonomous distributed computing method for use in a facility, the facility including at least one shelving unit having a first set of machine-readable representations disposed along a front face of a shelf of the shelving unit and a second set of machine-readable representations disposed along a front surface of a back wall of the shelving unit above the front face and vertically aligned with the first set of machine-readable representations such that when physical objects are disposed on the shelf the first set of machine-readable representations are visible and the second set of machine-readable representations are obscured by the physical objects, the method comprising:
  roaming, via an autonomous robot device including a controller, a drive motor, and an optical scanning machine, autonomously through the facility in response to operation of the drive motor by the controller;
  detecting, via the optical scanner of the autonomous robot device, at a first location along the shelf, a first machine-readable representation from the first set of machine-readable representations and a corresponding first machine-readable representation from the second set of machine-readable representations;
  determining that the first machine-readable representation is identical to the corresponding first machine-readable representation; and
  in response to determining the first machine-readable representation is identical to the corresponding first machine-readable representation determining, via the autonomous robot device, that additional physical objects associated with the first machine-readable representation are required at the first location.

13. The method of claim 12, wherein the autonomous robot device further comprising an inertial navigation system including an accelerometer and a gyroscope.

14. The method of claim 13, wherein the autonomous robot device roams the facility using the inertial navigation system.

15. The method of claim 12, wherein the autonomous robot device roams the facility based on a predetermined path.

16. The method of claim 12, further comprising,
  detecting, via the optical scanner of the autonomous robot device, at a second location along the shelf, a second machine-readable representation from the first set of machine-readable representations;
  determining, via the autonomous robot device, that at least one physical object is obstructing a corresponding second machine-readable representation in the second set of machine-readable representations; and
  determining, via the autonomous robot device, that the at least one physical object corresponds to the first machine-readable representation of the first set.

17. The method of claim 16, wherein the autonomous robot device further comprising an image capturing device.

18. The method of claim 17, further comprising capturing, via the image capturing device of the autonomous robot device, an image of the second location and identify the at least one physical object obscuring the corresponding second machine-readable representation.

19. The method of claim 12, further comprising scanning, via the autonomous robot device, the first machine-readable representation and the corresponding first machine-readable representation in a single scan.

20. A non-transitory computer readable memory medium storing instructions for use in a facility, the facility including at least one shelving unit having a first set of machine-readable representations disposed along a front face of a shelf of the shelving unit and a second set of machine-readable representations disposed along a front surface of a back wall of the shelving unit above the front face and vertically aligned with the first set of machine-readable representations such that when physical objects are disposed on the shelf the first set of machine-readable representations are visible and the second set of machine-readable representations are obscured by the physical objects, wherein the instructions are executable by a processor of an autonomous robot device to cause the autonomous robot device to:
- roam, via an autonomous robot device including a controller, a drive motor, and an optical scanning machine, autonomously through the facility in response to operation of the drive motor by the controller;
- detect, via the optical scanner of the autonomous robot device, at a first location along the shelf, a first machine-readable representation from the first set of machine-readable representations and a corresponding first machine-readable representation from the second set of machine-readable representations;
- determine that the first machine-readable representation is identical to the corresponding first machine-readable representation; and
- in response to determining the first machine-readable representation is identical to the corresponding first machine-readable representation determine, via the autonomous robot device, that additional physical objects associated with the first machine-readable representation are required at the first location.

* * * * *